United States Patent
Gluck

(10) Patent No.: US 10,116,623 B2
(45) Date of Patent: *Oct. 30, 2018

(54) METHODS AND SYSTEMS FOR PROVIDING A TOKEN-BASED APPLICATION FIREWALL CORRELATION

(71) Applicant: salesforce.com, inc., San Francisco, CA (US)

(72) Inventor: Yoel Gluck, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/159,732

(22) Filed: May 19, 2016

(65) Prior Publication Data

US 2016/0269360 A1    Sep. 15, 2016

Related U.S. Application Data

(63) Continuation of application No. 12/982,751, filed on Dec. 30, 2010, now Pat. No. 9,350,705.

(Continued)

(51) Int. Cl.
*G06F 9/00* (2006.01)
*H04L 29/06* (2006.01)
(Continued)

(52) U.S. Cl.
CPC .... *H04L 63/0227* (2013.01); *G06F 17/30867* (2013.01); *G06F 17/30876* (2013.01);
(Continued)

(58) Field of Classification Search
CPC . H04L 63/0227; H04L 63/0209; H04L 63/08; H04L 63/0807; H04L 63/102; G06F 17/30867; G06F 17/30876
See application file for complete search history.

(56) References Cited

U.S. PATENT DOCUMENTS 5,577,188 A    11/1996  Zhu
5,608,872 A    3/1997   Schwartz et al.
(Continued)

FOREIGN PATENT DOCUMENTS

WO    2007098960 A1    9/2007

OTHER PUBLICATIONS

Dorothy E. Denning, An Intrusion-Detection Model, IEEE Transactions on Software Enfineering, vol. SE-13, No. 2, Feb. 1987, pp. 222-232.*

(Continued)

*Primary Examiner* — Luu Pham
*Assistant Examiner* — Canh Le
(74) *Attorney, Agent, or Firm* — Jaffery, Watson, Mendonsa & Hamilton, LLC

(57) ABSTRACT

Token-based firewall functionality. A request is received for access to a resource from a remote user device, the request received by an application firewall. A token is associated with the request. The token and associated information are stored in an event correlator coupled with the application firewall. The token is associated with one or more subsequent actions by the resource in response to receiving the request. A response to the request including the token is generated. The response with the token is transmitted to the remote user device via the application firewall. The application firewall analyzes the response and determines an action to be taken on the response based on the token and the associated information.

19 Claims, 7 Drawing Sheets

Related U.S. Application Data

(60) Provisional application No. 61/358,489, filed on Jun. 25, 2010.

(51) Int. Cl.
 *G06F 17/30* (2006.01)
 *H04L 29/08* (2006.01)

(52) U.S. Cl.
 CPC .......... *H04L 63/0209* (2013.01); *H04L 63/08* (2013.01); *H04L 63/0807* (2013.01); *H04L 63/102* (2013.01); *H04L 67/02* (2013.01)

(56) References Cited

U.S. PATENT DOCUMENTS

| | | | |
|---|---|---|---|
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,408,336 B1 | 6/2002 | Schneider et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,854,063 B1 | 2/2005 | Qu et al. |
| 6,880,089 B1 | 4/2005 | Bommareddy et al. |
| 7,058,822 B2 | 6/2006 | Edery et al. |
| 7,096,495 B1 | 8/2006 | Warrier et al. |
| 7,231,665 B1 | 6/2007 | McArdle et al. |
| 7,340,411 B2 | 3/2008 | Cook |
| 7,342,906 B1 | 3/2008 | Calhoun |
| 7,409,547 B2 | 8/2008 | Stamos et al. |
| 7,594,270 B2 | 9/2009 | Church et al. |
| 7,620,655 B2 | 11/2009 | Larsson et al. |
| 7,719,966 B2 | 5/2010 | Luft et al. |
| 7,797,752 B1 | 9/2010 | Vaidya et al. |
| 7,818,343 B1 | 10/2010 | Sekhar et al. |
| 8,087,081 B1 | 12/2011 | Chun et al. |
| 8,161,538 B2 | 4/2012 | Kausik |
| 8,353,021 B1 | 1/2013 | Satish et al. |
| 8,566,919 B2 | 10/2013 | Meisel |
| 8,904,511 B1 | 12/2014 | O'Neill et al. |
| 9,294,442 B1 | 3/2016 | Lian et al. |
| 2001/0044791 A1 | 11/2001 | Richter et al. |
| 2002/0022986 A1 | 2/2002 | Coker et al. |
| 2002/0029161 A1 | 3/2002 | Brodersen et al. |
| 2002/0029376 A1 | 3/2002 | Ambrose et al. |
| 2002/0035577 A1 | 3/2002 | Brodersen et al. |
| 2002/0042264 A1 | 4/2002 | Kim |
| 2002/0042843 A1 | 4/2002 | Diec |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0152102 A1 | 10/2002 | Brodersen et al. |
| 2002/0161734 A1 | 10/2002 | Stauber et al. |
| 2002/0162090 A1 | 10/2002 | Parnell et al. |
| 2002/0165742 A1 | 11/2002 | Robins |
| 2002/0199120 A1 | 12/2002 | Schmidt |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachadran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0088545 A1 | 5/2003 | Subramaniam et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0172167 A1 | 9/2003 | Judge et al. |
| 2003/0172291 A1 | 9/2003 | Judge et al. |
| 2003/0187921 A1 | 10/2003 | Diec |
| 2003/0189600 A1 | 10/2003 | Gune et al. |
| 2003/0191743 A1 | 10/2003 | Brodersen et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0088409 A1 | 5/2004 | Braemer et al. |
| 2004/0128001 A1 | 7/2004 | Levin et al. |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2005/0223022 A1 | 10/2005 | Weissman et al. |
| 2005/0262554 A1 | 11/2005 | Brooks et al. |

(56) References Cited

U.S. PATENT DOCUMENTS

| | | | |
|---|---|---|---|
| 2005/0283835 A1 | 12/2005 | Lalonde et al. | |
| 2006/0070122 A1 | 3/2006 | Bellovin | |
| 2006/0168345 A1 | 7/2006 | Siles et al. | |
| 2006/0206615 A1 | 9/2006 | Zheng et al. | |
| 2006/0212930 A1 | 9/2006 | Shull et al. | |
| 2007/0055694 A1 | 3/2007 | Ruge et al. | |
| 2007/0088534 A1* | 4/2007 | MacArthur | G05B 13/0295 703/17 |
| 2007/0118893 A1 | 5/2007 | Crawford | |
| 2007/0130130 A1 | 6/2007 | Chan et al. | |
| 2007/0299984 A1 | 12/2007 | Roy et al. | |
| 2008/0010243 A1 | 1/2008 | Weissman et al. | |
| 2008/0022384 A1 | 1/2008 | Yee et al. | |
| 2008/0229088 A1 | 9/2008 | Barth et al. | |
| 2008/0282338 A1 | 11/2008 | Beer | |
| 2008/0307525 A1 | 12/2008 | Nickle | |
| 2009/0126005 A1 | 5/2009 | Kim et al. | |
| 2009/0249125 A1* | 10/2009 | Bhatawdekar | G06F 17/30592 714/39 |
| 2009/0282045 A1* | 11/2009 | Hsieh | G06F 21/6218 |
| 2009/0288084 A1 | 11/2009 | Astete et al. | |
| 2009/0307533 A1* | 12/2009 | Niikkonen | G06F 11/0715 714/45 |
| 2009/0320131 A1 | 12/2009 | Huang | |
| 2010/0070323 A1 | 3/2010 | Polcari et al. | |
| 2010/0077468 A1 | 3/2010 | Pragides et al. | |
| 2010/0146615 A1 | 6/2010 | Locasto et al. | |
| 2010/0306184 A1 | 12/2010 | Wang | |
| 2010/0325357 A1 | 12/2010 | Reddy et al. | |
| 2010/0332837 A1* | 12/2010 | Osterwalder | H04L 63/0245 713/172 |
| 2011/0035794 A1 | 2/2011 | Wang et al. | |
| 2011/0055391 A1 | 3/2011 | Schneider | |
| 2011/0145435 A1 | 6/2011 | Bhatawdekar et al. | |
| 2011/0154471 A1 | 6/2011 | Anderson et al. | |
| 2011/0173443 A1 | 7/2011 | Osterwalder et al. | |
| 2011/0191848 A1 | 8/2011 | Zorn et al. | |
| 2012/0047577 A1 | 2/2012 | Costinsky | |
| 2012/0060221 A1 | 3/2012 | Gerber et al. | |
| 2012/0222117 A1 | 8/2012 | Wong et al. | |

OTHER PUBLICATIONS

Bhaskar Prasad Rimal, "A Taxonomy and Survey of Cloud Computing Systems," 2009 Fifth International Joint Conference on INC, IMS, and IDS, pp. 44-51.*
Non-Final Office Action for U.S. Appl. No. 12/982,751 dated Dec. 17, 2014, 15 pages.
Non-Final Office Action for U.S. Appl. No. 12/982,751 dated Oct. 25, 2012, 16 pages.
Final Office Action for U.S. Appl. No. 12/982,751 dated May 22, 2013, 18 pages.
Final Office Action for U.S. Appl. No. 12/982,751 dated Jun. 12, 2015, 18 pages.
Notice of Allowance for U.S. Appl. No. 12/982,751 dated Jan. 21, 2016, 17 pages.
Dorothy Denning et al. "Requirement and Model for IDES—A Real-time Intrusion-detection Expert System," Aug. 1985, SRI International, 74 pages.
Bhaskar Rimal et al. "A Taxonomy and Survey of Cloud Computing Systems," 2009, IEEE Computer Society, 8 pages.
Final Office Action for U.S. Appl. No. 12/982,725, dated Dec. 31, 2013, 18 pages.
Final Office Action for U.S. Appl. No. 12/982,725, dated Nov. 19, 2014, 24 pages.
Final Office Action for U.S. Appl. No. 12/982,769, dated Dec. 26, 2014, 12 pages.
Final Office Action for U.S. Appl. No. 12/982,769, dated Feb. 4, 2013, 8 pages.
Final Office Action for U.S. Appl. No. 15/194,333, dated Jan. 19, 2018, 9 pages.
Non-Final Office Action for U.S. Appl. No. 12/982,725, dated Jun. 19, 2014, 21 pages.
Non-Final Office Action for U.S. Appl. No. 12/982,725, dated Mar. 29, 2013, 18 pages.
Non-Final Office Action for U.S. Appl. No. 12/982,769 dated Aug. 23, 2012, 9 pages.
Non-Final Office Action for U.S. Appl. No. 12/982,769, dated Jun. 11, 2014, 21 pages.
Non-Final Office Action for U.S. Appl. No. 12/982,769, dated Sep. 21, 2015, 12 pages.
Non-Final Office Action for U.S. Appl. No. 15/194,429 dated Nov. 14, 2016, 9 pages.
Non-Final Office Action for U.S. Appl. No. 15/194,333 dated Jul. 31, 2017, 13 pages.
Notice of Allowance for U.S. Appl. No. 12/982,725 dated Jun. 3, 2015, 8 pages.
Notice of Allowance for U.S. Appl. No. 14/874,225 dated Mar. 31, 2016, 10 pages.
Notice of Allowance for U.S. Appl. No. 15/194,429 dated Apr. 10, 2017, 8 pages.
Notice of Allowance for U.S. Appl. No. 15/194,333 dated Jun. 4, 2018, 10 pages.
Web Canary: A Virtualized Web Browser to Support Large-Scale Silent Collaboration in Detecting Malicious Web Sites; Jiang Wang et al.; CollaborateCom 2008, LNICST 10, pp. 24-33, 2009.

* cited by examiner

METHODS AND SYSTEMS FOR PROVIDING A TOKEN-BASED APPLICATION FIREWALL CORRELATION

CLAIM OF PRIORITY

This application is a continuation of U.S. patent application Ser. No. 12/982,751, filed Dec. 30, 2010 by Yoel Gluck entitled "METHODS AND SYSTEMS FOR PROVIDING A TOKEN-BASED APPLICATION FIREWALL CORRELATION," which claims the benefit of U.S. Provisional Patent Application 61/358,489 entitled Methods And Systems For Providing a Token-Based Application Firewall Correlation, by Yoel Gluck, filed Jun. 25, 2010, the entire contents of both are incorporated herein by reference.

CROSS REFERENCE TO RELATED APPLICATIONS

The following commonly owned, co-pending United States Patents and Patent Applications, including the present application, are related to each other. Each of the other patents/applications are incorporated by reference herein in its entirety:

U.S. patent application Ser. No. 12/982,725 entitled "METHODS AND SYSTEMS FOR CONTEXT-BASED APPLICATION FIREWALLS," by Yoel Gluck, filed Dec. 30, 2010, now U.S. Pat. No. 9,160,710; and U.S. patent application Ser. No. 14/874,225 entitled "METHODS AND SYSTEMS FOR CONTEXT-BASED APPLICATION FIREWALLS," by Yoel Gluck, filed Oct. 2, 2015, which is a continuation application of U.S. patent application Ser. No. 12/982,725; and U.S. patent application Ser. No. 12/982,769 entitled "METHODS AND SYSTEMS FOR PROVIDING CONTEXT-BASED OUTBOUND PROCESSING APPLICATION FIREWALLS," by Yoel Gluck, filed Dec. 30, 2010.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

Embodiments of the invention relate generally to firewalls and network security. More particularly, embodiments of the invention relate to techniques for providing correlation to application firewall sub-systems.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Web applications are a big part of applications today. They vary from simple web site, travel and booking, enterprise, banking applications and many more. Each of these applications has a set of security threats relevant to it. These applications tend to have security code integrated in to the application itself, however; because these applications are relatively large, the surface is too big to cover with a single choke point. With the increased complexity comes additional risk for undetected vulnerabilities. This is one of the reasons web applications some times use a separate web application firewall system. This allows a separate code base to use a single choke point and evaluate the entire application behavior at run time for potential vulnerabilities.

One current method to correlate between a firewall and other systems is a timing based approach. For example, if when request A is received, a web application performs a specific database query B, the firewall and/or the web application will connect the two events and search for deviations. This approach is not accurate in the learning and also not accurate in the enforcing phases unless under very strict lab environments without any other noise.

BRIEF DESCRIPTION OF THE DRAWINGS

In the following drawings like reference numbers are used to refer to like elements. Although the following figures depict various examples of the invention, the invention is not limited to the examples depicted in the figures.

DETAILED DESCRIPTION

Figure 1:
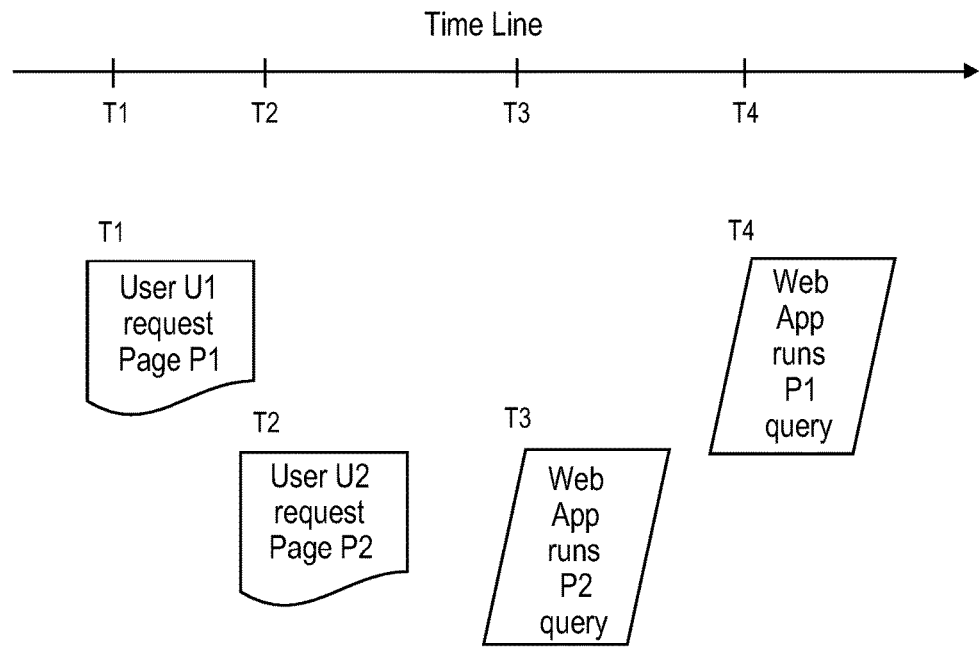
FIG. 1 is a conceptual illustration of a race condition involving two page requests from two users.

As used herein, "application firewall" and/or "firewall" generally refers to an application firewall entity that provides a higher-level analysis of network traffic (e.g., the application level, layer 5+), for example, inspecting traffic specific to an application based on the logic of the application. In contrast, traditional firewalls inspect Layers 3 and 4 and generally do IP- and port-based filtering and logic. Described herein are context-based application firewalls that utilize tokens to track messages to and from one or more applications. The techniques described herein may be utilized by application firewalls, but may also be incorporated into traditional firewalls.

Described herein are various configurations that support token-based application firewall functionality. The firewall may operate between a user device and a resource to monitor and/or control network traffic. In one embodiment, the resource is part of a multitenant environment, for example, a multitenant database system; however, token-based firewall functionality may be provided in different environments as well.

In general, a firewall is a part of a computer system or network that is designed to block unauthorized access while permitting authorized communications. The firewall may be configured as a device or set of devices that permits or denies network transmissions based upon a set of rules and other criteria. Firewalls can be implemented in either hardware or software, or a combination of both. Firewalls are frequently used to prevent unauthorized Internet users from accessing private networks connected to the Internet, especially intranets.

In one embodiment, all messages entering or leaving a multitenant (or other) environment pass through the firewall. The firewall operates monitors each message and blocks those that do not meet the specified security criteria. As described herein, the application firewall and/or sub-agents of the application firewall may utilize tokens to track various sessions, messages, traffic, in a manner to provide more efficient firewall functionality than would otherwise be possible.

As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers.

In one embodiment, a multi-tenant database system utilizes tenant identifiers (IDs) within a multi-tenant environment to allow individual tenants to access their data while preserving the integrity of other tenant's data. In one embodiment, the multitenant database stores data for multiple client entities each identified by a tenant ID having one or more users associated with the tenant ID. Users of each of multiple client entities can only access data identified by a tenant ID associated with their respective client entity. In one embodiment, the multitenant database is a hosted database provided by an entity separate from the client entities, and provides on-demand and/or real-time database service to the client entities.

In web applications, and especially in multi-tenant environments, while one user is requesting one page, another user may be requesting another page. It becomes difficult to separate the users and correlate the specific events to specific causes.

FIG. 1 is a conceptual illustration of a race condition involving two page requests from two users. First, User U1 sends a request for page P1 at time T1. Then, user U2 sends a request for page P2 at time T2. The server first picks up the second request from user U2 and runs a database query at time T3. Subsequently, the server runs another query for user U1 at time T4. The firewall may not be able to determine if T3 is tied to T1 and T4 is tied to T2, or if both T3 and T4 are related to a single user request and the other was denied, etc.

Token based application firewall correlation techniques described herein provide the ability to correlate between the firewall, the web application and other web application sub-systems such as the database, file system, outbound queries etc. In one embodiment, in order to properly correlate the events, an identifying token is added to the session context, the token is then injected into the different database queries, outbound connections, file logs, and other events allowing the firewall to correlate them all to the specific event/session it is tracking.

In one embodiment, the token can be added based on the specifics of the sub-system. For example a query to the database can add perhaps to a where clause that is always true so it will not affect the results. A HyperText Transfer Protocol (HTTP) request, for example, can contain a token in the headers, etc. In addition, if the firewall agent (i.e., the agent in the component sensing the events on a sub-systems) is in-line of the event, it can remove the token before forwarding the request to the sub-system. One or more components of the system (e.g., firewall, application, sub-system agents, subsystems) can use the tokens and/or related information to correlate, collect context information, generate context information, evaluate and/or react.

In addition to correlating the request query, the firewall agent and/or web application may also correlate the response from the database or other server resource. This may be accomplished by including a token in the response(s). In one embodiment, for each original event at the firewall there might be multiple events originating from it. For example, when a user requests page A the server might first run multiple queries on the database, then it might call a remote server, then update the database, and finally return a response to the user. All these events can use a token corresponding to the user session for the firewall to process.

Using this approach the firewall can create much more accurate statistical models with many sub-systems to correctly identify abnormalities and react based on policies. These reactions may be concrete reactions such as blocking the session, alerting an administrator, redirecting the Universal Resource Locator (URL) to a less sensitive application section, or it may be included in further scoring and calculations, etc. Further scoring may be, for example, when a total score is maintained over the lifetime of a session or a transaction, the score may be updated by various system entities (e.g., application, firewall, sub-system). This score can be utilized as part of the context information to allow other components to determine an appropriate action.

Figure 2:
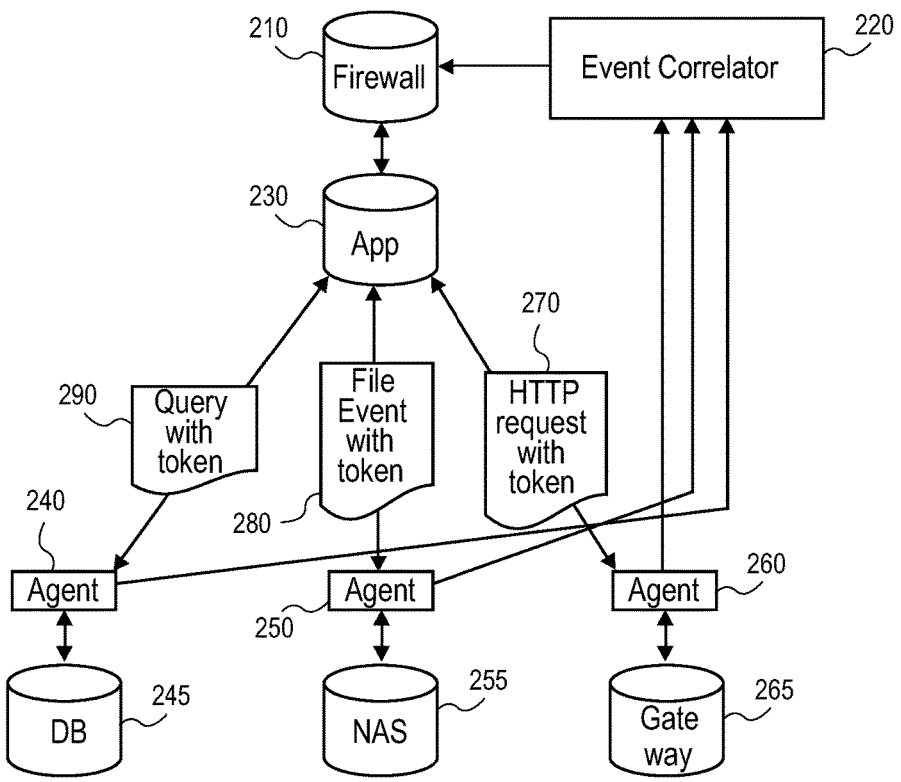
FIG. 2 is a block diagram of one embodiment of a system that may support token-based firewall functionality.

FIG. 2 is a block diagram of one embodiment of a system that may support token-based firewall functionality. The example of FIG. 2 is directed to a server that provides functionality to a remote user device (not illustrated in FIG. 2) with application 230. Traffic between the remote user device and application 230 passes through firewall 210 as well as one or more network nodes (e.g., routers, hubs, access points).

As discussed above, traffic through firewall 210 may include a token. The tokens are used by firewall 210, event correlator 220, and/or agents 240, 250, 260 to act on the traffic in a more intelligent manner than traditional application firewalls. The agents may be independent entities, or they may be part of another system or sub-system (e.g., part of a database, part of an application, integrated into a server). In one embodiment, session tokens and/or additional information may be added to network traffic (e.g., requests, actions, outbound requests, database queries, file system activity) during the session. The tokens can be used to link the traffic and/or activity back to the original request or session so that firewall 210 or other system components may provide firewall functionality.

In the example of FIG. 2, traffic received by firewall 210 is processed using information from event correlator 220. This information may include at least tokens associated with sessions and/or initial requests. The tokens and/or other information may be utilized by firewall to determine what action to take, for example, pass the traffic to application 230, block the traffic, pass the traffic to application 230 with flags or other indicators.

When application 230 receives traffic from firewall 210, application 230 proceeds to process the traffic, for example, provide requested information, perform database queries, generate network requests, modify files, etc. Thus, application 230 may interact with one or more resources to respond to the request from the user device. In the example of FIG. 2, database 245, file system 255 and gateway 265 are illustrated; however, any number and/or type of resources/ systems may be supported.

In one embodiment, application 230 is part of a multi-tenant environment in which one or more applications provide services to multiple tenants concurrently. More detailed descriptions of multitenant environments as well as the functionality and configuration thereof, are provided below.

In one embodiment, one or more agents (e.g., 240, 250, 260) may operate to manage interactions to and from application 230. These agents may have access to information provided by event correlator 220 that may be used in a similar manner as firewall 210. In one embodiment, agents 240, 250, 260 operate as sub-agents of firewall 210. That is agents 240, 250, 260 may perform firewall functions using information from event correlator 220. This may provide a better and more secure operating environment than relying on firewall 210 alone.

For example, in response to a request that may require a database query, application 230 may send a query with the token, 290, to database 245. The query may be processed by agent 240 that may operate to generate context information for firewall/security purposes. In one embodiment, agent 240 may remove the token after processing the query. In other embodiments, agent 240 may leave the token in the query.

In one embodiment, for database queries, a condition that is always true may be added so that the query result is not changed by the additional information. This additional condition may include the token and/or other information. By including the token and/or additional information in the logic of the query, the token and/or additional information will not be deleted by database management. In another embodiment, comments sections and/or headers may be used to transmit the token.

In another example, in response to a request that may require file manipulation, application 230 may send a file event with a token, 280, to file system 255. The file event may be processed by agent 250 that may operate to generate context information for firewall/security purposes. In one embodiment, agent 250 may remove the token after processing the file event. In other embodiments, agent 250 may leave the token in the file event.

In a third example, in response to a request that may require a network request (e.g., HTTP request), application 230 may send a network request with a token, 270, to gateway 265. The network request may be processed by agent 260 that may operate to generate context information for firewall/security purposes. In one embodiment, agent 260 may remove the token after processing the network request. In other embodiments, agent 260 may leave the token in the network request.

In one embodiment, for network requests, the token may be added to a HTTP header or other protocol header. The token may be added to other parts of the network request as well. By adding the network request and ensuring that the return traffic includes the token, the traffic may be monitored even if the return traffic comes through a different channel than the outbound traffic.

The examples described above were for requests and/or traffic from application 230 to resources available to application 230. The same type of processing may be provided by agents 240, 250, 260 for traffic from the resources/systems to application 230. Thus, traffic between application 230 and database 245, for example, may be treated in a similar manner as traffic between application 230 and a remote user device.

Figure 3:
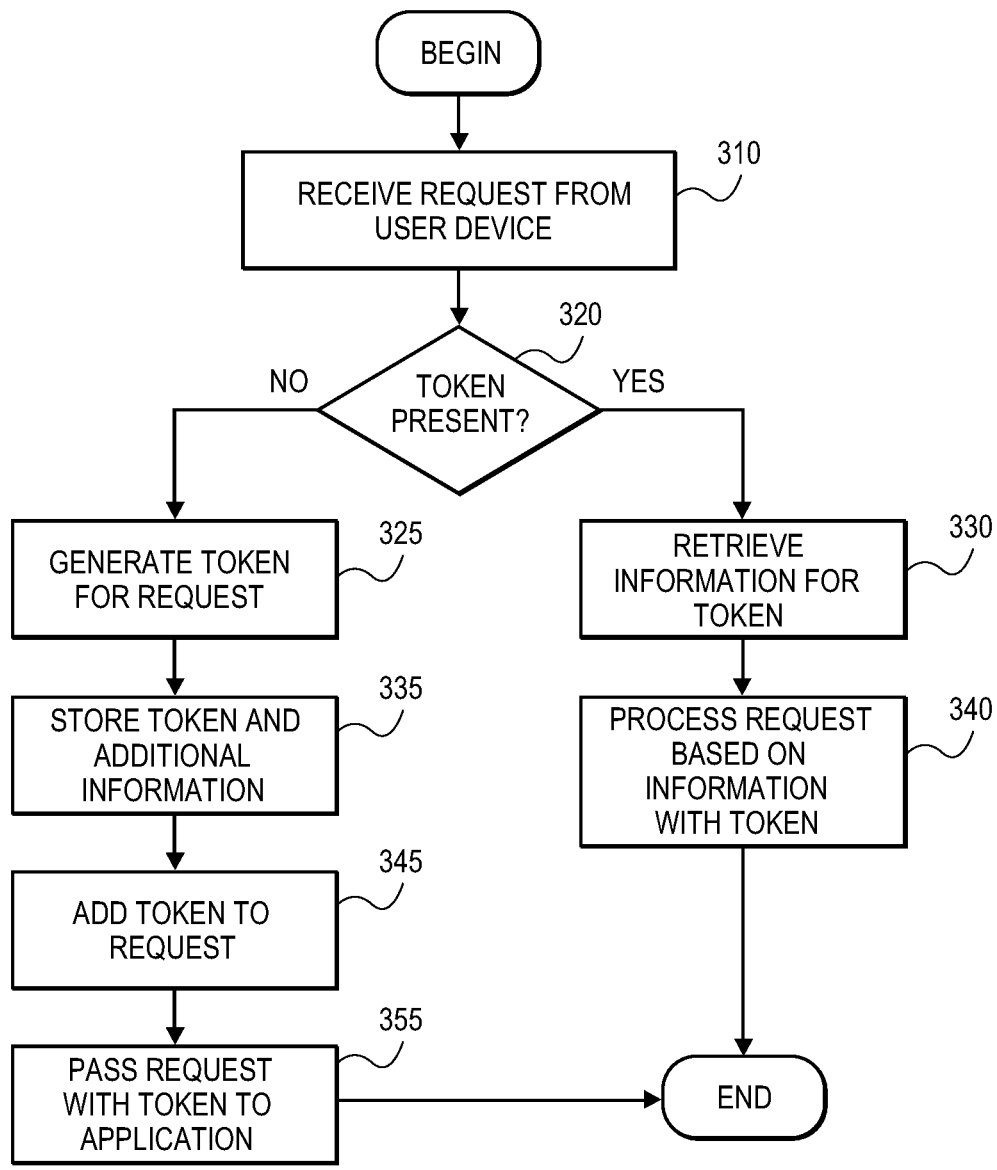
FIG. 3 is a flow diagram for network traffic processing utilizing token-based firewall functionality.

FIG. 3 is a flow diagram for network traffic processing utilizing token-based firewall functionality. In one embodiment, the functionality of FIG. 3 is provided by a firewall, or a combination of a firewall and one or more agents as illustrated in FIG. 2. However, in other embodiments, the functionality of FIG. 3 may be distributed among other components as well.

The firewall may receive a request from a user device, 310. The request may have a token that may associate the request with a previous request, or the request may have no associated token, or have an invalid token. If a token is present in the request and it is valid, 320, the firewall may retrieve information related to the token, 330. The request can then be processed by the firewall based on information associated with the token, 340. The firewall may retrieve information based on the token from an event correlator as described above.

If the request does not have a token or the token is invalid, 320, the firewall and/or the event correlator may operate to generate a token to be associated with the request, 325. Information corresponding to the token (e.g., policies, limits, identifiers) may be stored with the token in the event correlator, 335. While the example of FIG. 3 illustrates and describes certain steps in certain orders, the functionality described herein may be accomplished by a different ordering. For example, the token may be added to the request before the token and information are stored in the event correlator.

The token is added to the request, 345. As discussed above, the token may be added to a header of the request, may be included in the logic of the request, etc. The token and request are passed to the application, 355.

Figure 4:
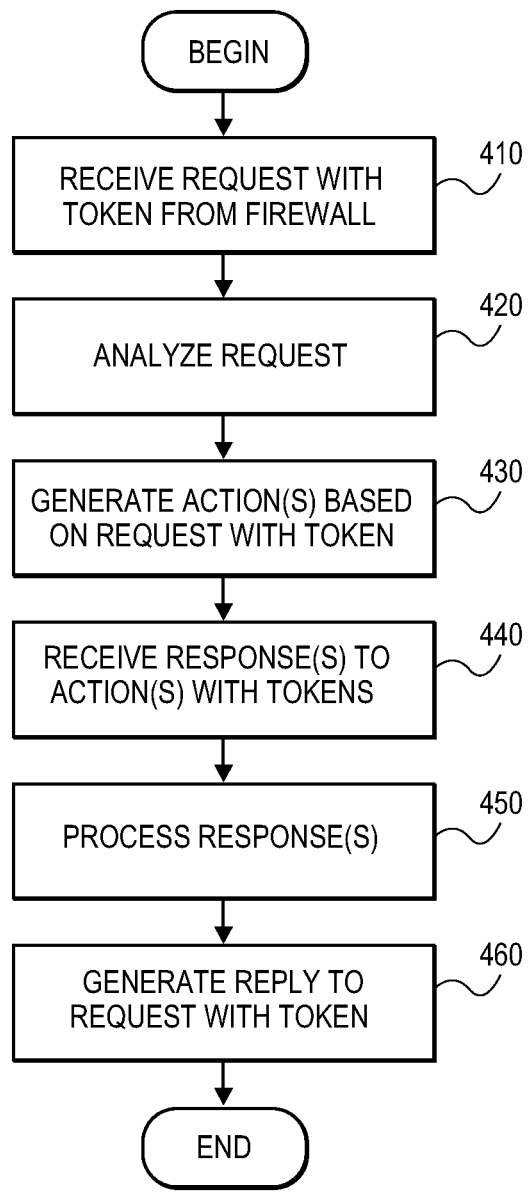
FIG. 4 is a flow diagram for application processing of a request in an environment utilizing a token-based firewall functionality.

FIG. 4 is a flow diagram for application processing of a request in an environment utilizing a token-based firewall functionality. In one embodiment, the functionality of FIG. 4 is provided by an application on a host device that communicates with the firewall discussed above, or a combination of an application and one or more agents as illustrated in FIG. 2. However, in other embodiments, the functionality of FIG. 4 may be distributed among other components as well.

The application receives the request from the firewall, 410. The request includes the token as described above. The token may be included in the logic of the request, or the token may be attached to the request, for example, in a header. The application may then use the token for future actions that are associated with the request.

The application analyzes the request, 420. To analyze the request, the application determines what services and or resources (generally referred to as "actions") may be provided to the user device sending the request. The application may operate as described above with respect to FIG. 2 (e.g., generating database queries, file events, network events).

When the application generates one or more actions based on the request, those actions include the token, 430. The actions with associated tokens may be used, for example, by agents (e.g., 240, 250, 260 in FIG. 2) within the host system upon which the application is running to make traffic management actions. In one embodiment, agents on other devices (not illustrated in FIG. 2) may operate in a similar manner as well.

When the application receives responses from the actions, the responses may also include the token, 440. The responses are processed as needed, 450. The responses are utilized by the application to generate a reply to the request previously received from the firewall. The reply may also include the token, 460, so that the firewall can track the requests and responses to provide a more effective management of traffic than would otherwise be available.

Figure 5:
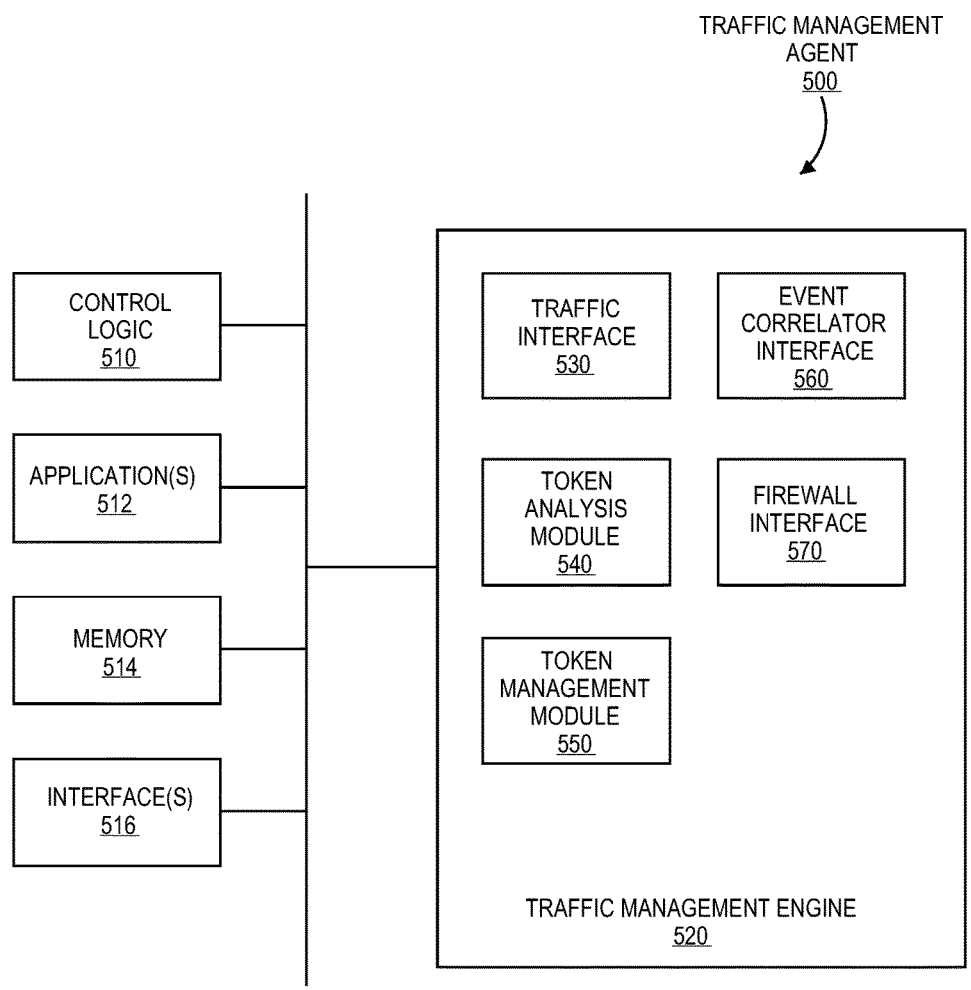
FIG. 5 is a block diagram of one embodiment of a traffic management agent that may be utilized in an environment supporting a token-based firewall functionality.

FIG. 5 is a block diagram of one embodiment of a traffic management agent that may be utilized in an environment supporting a token-based firewall functionality. In one embodiment, traffic management agent 500 resides in a firewall to provide the token-based firewall functionality discussed herein. In one embodiment, traffic management agent 500 provides the functionality described with respect to FIG. 3.

Traffic management agent 500 includes control logic 510, which implements logical functional control to direct operation of traffic management agent 500, and/or hardware associated with directing operation of traffic management agent 500. Logic may be hardware logic circuits and/or software routines. In one embodiment, traffic management agent 500 includes one or more applications 512, which represent code sequence and/or programs that provide instructions to control logic 510.

Traffic management agent 500 includes memory 514, which represents a memory device and/or access to a memory resource for storing data and/or instructions. Memory 514 may include memory local to traffic management agent 500, as well as, or alternatively, including memory of the host system on which traffic management agent 500 resides. Traffic management agent 500 also includes one or more interfaces 516, which represent access interfaces to/from (an input/output interface) traffic management agent 500 with regard to entities (electronic or human) external to traffic management agent 500.

Traffic management agent 500 also includes traffic management engine 520, which represents one or more functions or module that enable traffic management agent 500 to provide the traffic management services as described above. The example of FIG. 5 provides several modules that may be included in traffic management engine 520; however, different and/or additional modules may also be included. Example modules that may be involved in providing the traffic management functionality traffic interface 530, token analysis module 540, token management module 550, event correlator interface 560 and firewall interface 570. Each of these modules may further include other sub-modules to provide other functions. As used herein, a module refers to routine, a subsystem, logic circuit, microcode, etc., whether implemented in hardware, software, firmware or some combination thereof.

Traffic interface 530 provides an interface for traffic management engine 520 to send and receive network traffic. Token analysis module 540 operates to locate tokens within network traffic. As discussed above, the tokens may be in different locations depending on the type of traffic. Further, tokens may be copied and/or moved during processing by traffic management engine 520. In one embodiment, token analysis module 540 provides the functionality to copy and/or move the tokens.

Token management module 550 provides traffic management engine 520 with the functionality to make, or cause to be made, firewall operations based on information associated with the tokens. For example, token management module 550 may flag certain traffic, or token management module 550 may cause one or more frames to be dropped.

Event correlator interface 560 provides an interface between traffic management engine 520 and an external event correlator (e.g., 220 in FIG. 2). Similarly, firewall interface 570 provides an interface between traffic management engine 520 and a firewall (e.g., 210 in FIG. 2). In one embodiment, traffic management agent 500 is a part of the firewall, in which case firewall interface 570 provides an interface to the host firewall. Other configurations may also be supported.

Figure 6:
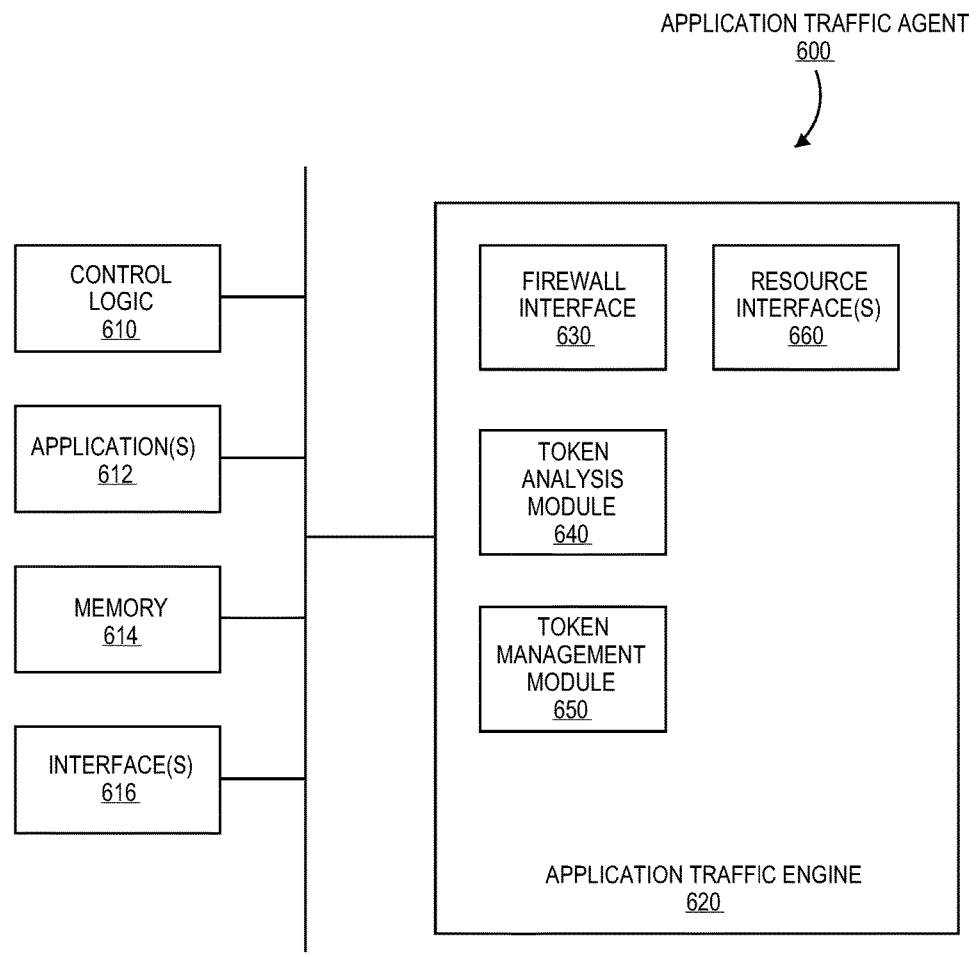
FIG. 6 is a block diagram of one embodiment of an application traffic management agent that may be utilized in an environment supporting a token-based firewall functionality.

FIG. 6 is a block diagram of one embodiment of an application traffic management agent that may be utilized in an environment supporting a token-based firewall functionality. In one embodiment, application traffic management agent 600 resides in an application to provide the token-based firewall functionality discussed herein. In one embodiment, application traffic agent 600 provides the functionality described with respect to FIG. 4.

Application traffic agent 600 includes control logic 610, which implements logical functional control to direct operation of application traffic agent 600, and/or hardware associated with directing operation of application traffic agent 600. Logic may be hardware logic circuits and/or software routines. In one embodiment, application traffic agent 600 includes one or more applications 612, which represent code sequence and/or programs that provide instructions to control logic 610.

Application traffic management agent 600 includes memory 614, which represents a memory device and/or access to a memory resource for storing data and/or instructions. Memory 614 may include memory local to application traffic agent 600, as well as, or alternatively, including memory of the host system on which application traffic agent 600 resides. Application traffic management agent 600 also includes one or more interfaces 616, which represent access interfaces to/from (an input/output interface) application traffic agent 600 with regard to entities (electronic or human) external to application traffic agent 600.

Application traffic agent 600 also includes application traffic engine 620, which represents one or more functions or module that enable application traffic agent 600 to provide the traffic management services as described above. The example of FIG. 6 provides several modules that may be included in application traffic engine 620; however, different and/or additional modules may also be included. Example modules that may be involved in providing the traffic management functionality include firewall interface 630, token analysis module 640, token management module 650 and resource interface(s) 660. Each of these modules may further include other sub-modules to provide other functions. As used herein, a module refers to routine, a subsystem, logic circuit, microcode, etc., whether implemented in hardware, software, firmware or some combination thereof.

Firewall interface 630 provides an interface between application traffic engine 620 and the firewall (e.g., 210 in FIG. 2). In one embodiment, firewall interface 630 allows a host application to receive traffic from the firewall, as described above. Token analysis module 640 operates to locate tokens within network traffic. As discussed above, the tokens may be in different locations depending on the type of traffic. Further, tokens may be copied and/or moved during processing by application traffic engine 620. In one embodiment, token analysis module 640 provides the functionality to copy and/or move the tokens.

Token management module 650 provides application traffic engine 620 with the functionality to make, or cause to be made, firewall operations based on information associated with the tokens. For example, token management module 650 may flag certain traffic, or token management module 650 may cause one or more frames to be dropped. Further, token management module 650 may allow application traffic engine 620 to include the token within actions spawned to respond to network traffic, as described above. Resource interface(s) provide an interface between application traffic engine 620 and one or more resource (e.g., database 245, file system 255, gateway 265 of FIG. 2).

Figure 7:
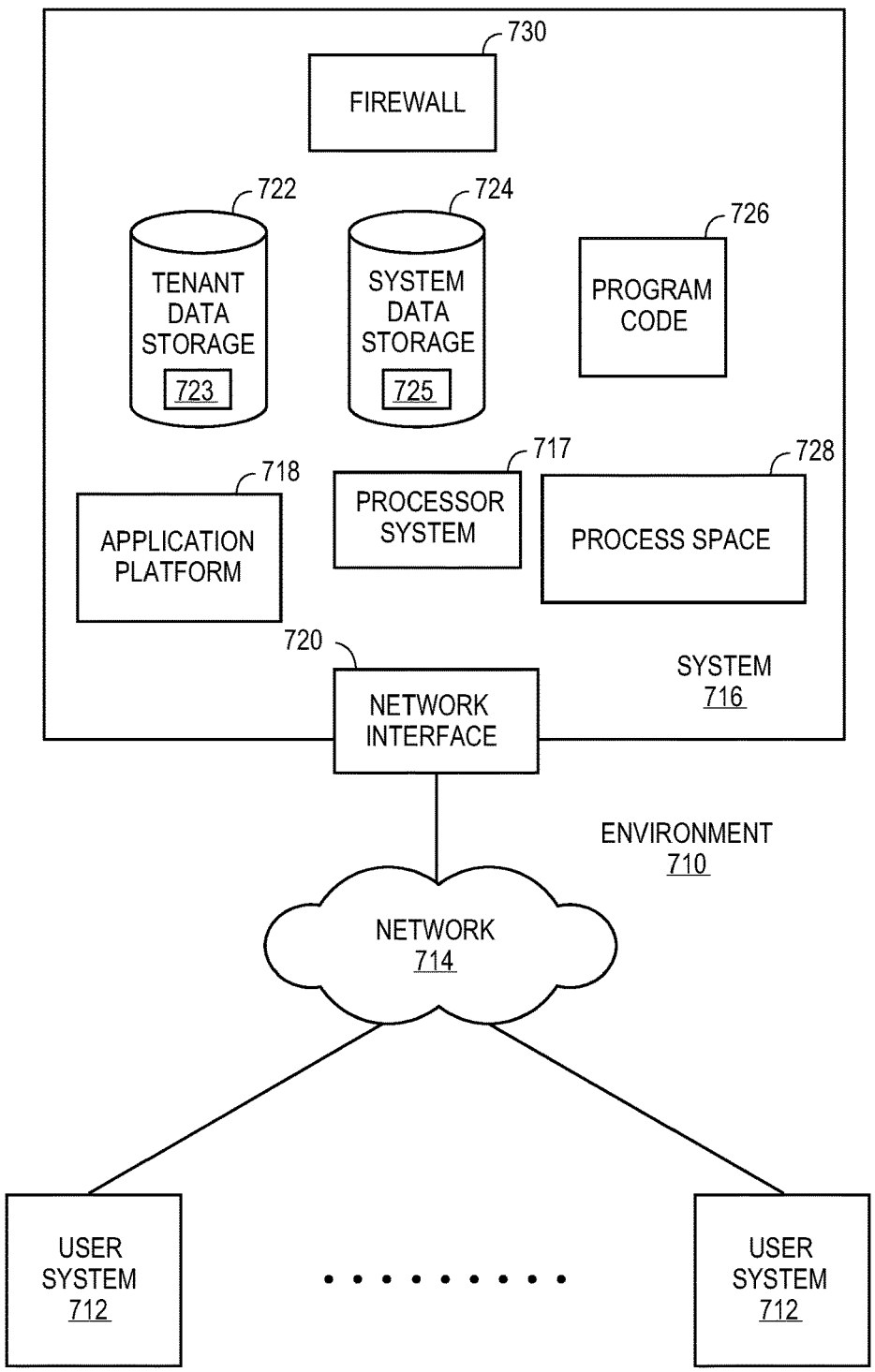
FIG. 7 is a block diagram of an environment in which an on-demand database service might be used.

FIG. 7 illustrates a block diagram of an environment 710 wherein an on-demand database service might be used. Environment 710 may include user systems 712, network 714, system 716, processor system 717, application platform 718, network interface 720, tenant data storage 722, system data storage 724, program code 726, and process space 728. In other embodiments, environment 710 may not have all of the components listed and/or may have other elements instead of, or in addition to, those listed above.

Environment 710 is an environment in which an on-demand database service exists. User system 712 may be any machine or system that is used by a user to access a database user system. For example, any of user systems 712 can be a handheld computing device, a mobile phone, a laptop computer, a work station, and/or a network of computing devices. As illustrated in FIG. 7 (and in more detail in FIG. 8) user systems 712 might interact via a network 714 with an on-demand database service, which is system 716. In one embodiment, system 716 includes firewall 730, which operates as described herein.

An on-demand database service, such as system 716, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 716" and "system 716" will be used interchangeably herein. A database image may include one or more database objects.

A relational database management system (RDMS) or the equivalent may execute storage and retrieval of information against the database object(s). Application platform 718 may be a framework that allows the applications of system 716 to run, such as the hardware and/or software, e.g., the operating system. In an embodiment, on-demand database service 716 may include an application platform 718 that enables creation, managing and executing one or more applications developed by the provider of the on-demand database service, users accessing the on-demand database service via user systems 712, or third party application developers accessing the on-demand database service via user systems 712.

The users of user systems 712 may differ in their respective capacities, and the capacity of a particular user system 712 might be entirely determined by permissions (permission levels) for the current user. For example, where a salesperson is using a particular user system 712 to interact with system 716, that user system has the capacities allotted to that salesperson. However, while an administrator is using that user system to interact with system 716, that user system has the capacities allotted to that administrator.

In systems with a hierarchical role model, users at one permission level may have access to applications, data, and database information accessible by a lower permission level user, but may not have access to certain applications, database information, and data accessible by a user at a higher permission level within the same hierarchy branch, and/or any level (lower, equal, and higher) in another hierarchy branch. Thus, different users will have different capabilities with regard to accessing and modifying application and database information, depending on a user's security or permission level.

Network 714 is any network or combination of networks of devices that communicate with one another. For example, network 714 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the present invention might use are not so limited, although TCP/IP is a frequently implemented protocol.

User systems 712 might communicate with system 716 using TCP/IP and, at a higher network level, use other common Internet protocols to communicate, such as HTTP, FTP, AFS, WAP, etc. In an example where HTTP is used, user system 712 might include an HTTP client commonly referred to as a "browser" for sending and receiving HTTP messages to and from an HTTP server at system 716. Such an HTTP server might be implemented as the sole network interface between system 716 and network 714, but other techniques might be used as well or instead. In some implementations, the interface between system 716 and network 714 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 716, shown in FIG. 7, implements a web-based customer relationship management (CRM) system. For example, in one embodiment, system 716 includes application servers configured to implement and execute CRM software applications as well as provide related data, code, forms, web pages and other information to and from user systems 712 and to store to, and retrieve from, a database system related data, objects, and Webpage content.

With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 716 implements applications other than, or in addition to, a CRM application. For example, system 716 may provide tenant access to multiple hosted (standard and custom) applications, including a CRM application. User (or third party developer) applications, which may or may not include CRM, may be supported by the application platform 718, which manages creation, storage of the applications into one or more database objects and executing of the applications in a virtual machine in the process space of the system 716.

One arrangement for elements of system 716 is shown in FIG. 7, including a network interface 720, application platform 718, tenant data storage 722 for tenant data 723, system data storage 724 for system data 725 accessible to system 716 and possibly multiple tenants, program code 726 for implementing various functions of system 716, and a process space 728 for executing MTS system processes and tenant-specific processes, such as running applications as part of an application hosting service. Additional processes that may execute on system 716 include database indexing processes.

Several elements in the system shown in FIG. 7 include conventional, well-known elements that are explained only briefly here. For example, each user system 712 could include a desktop personal computer, workstation, laptop, PDA, cell phone, or any wireless access protocol (WAP) enabled device or any other computing device capable of interfacing directly or indirectly to the Internet or other network connection. User system 712 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 712 to access, process and view information, pages and applications available to it from system 716 over network 714.

Each user system 712 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 716 or other systems or servers. For example, the user interface device can be used to access data and applications hosted by system 716, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 712 and all of its components are operator configurable using applications, such as a browser, including computer code run using a central processing unit such as an Intel Pentium® processor or the like. Similarly, system 716 (and additional instances of an MTS, where more than one is present) and all of their components might be operator configurable using application(s) including computer code to run using a central processing unit such as processor system 717, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein.

Computer code for operating and configuring system 716 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data.

Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments of the present invention can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 716 is configured to provide webpages, forms, applications, data and media content to user (client) systems 712 to support the access by user systems 712 as tenants of system 716. As such, system 716 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B).

As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 8:
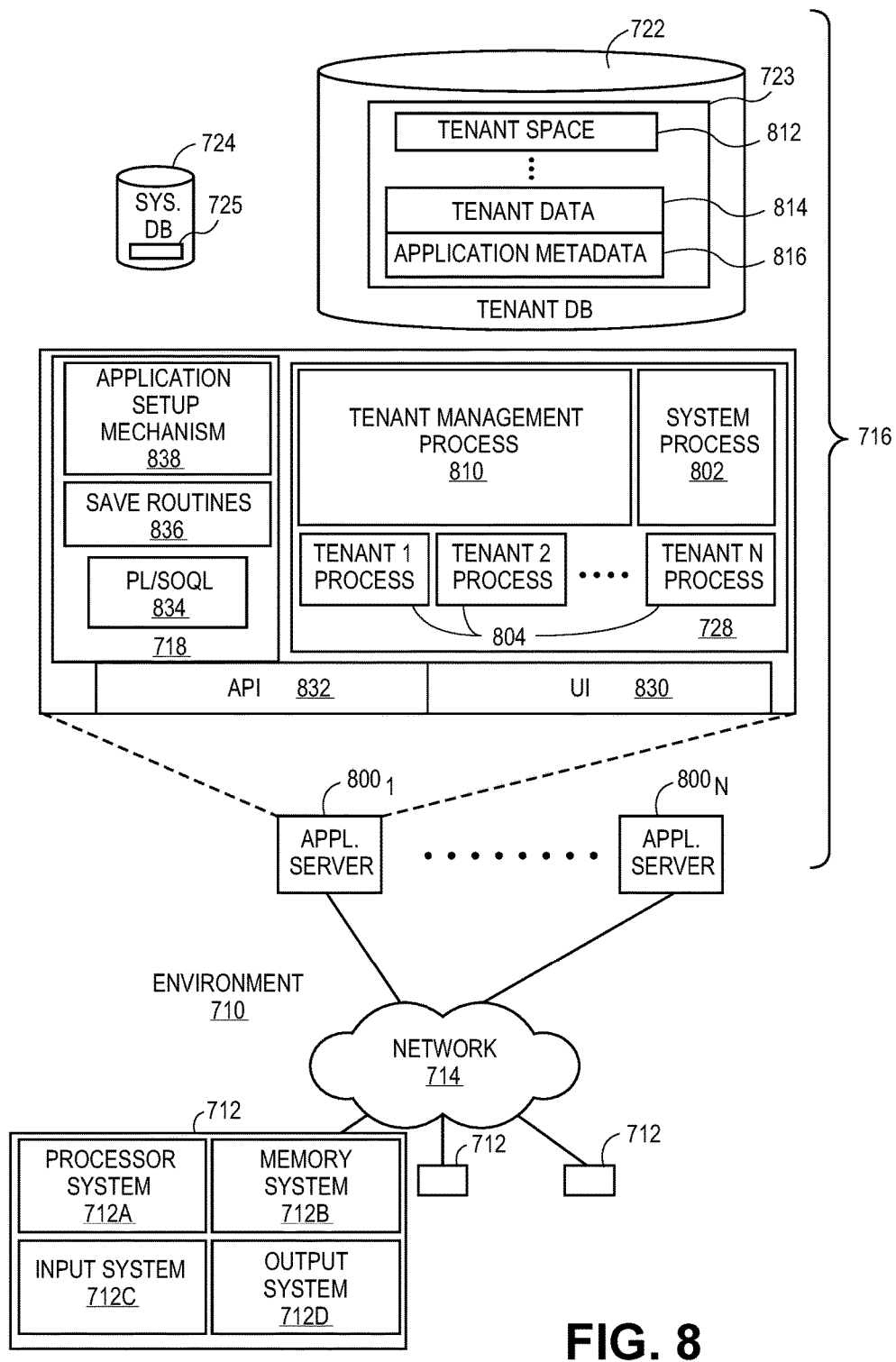
FIG. 8 is a block diagram of one embodiment of a multi-tenant environment.

FIG. 8 also illustrates environment 710. However, in FIG. 8 elements of system 716 and various interconnections in an embodiment are further illustrated. FIG. 8 shows that user system 712 may include processor system 712A, memory system 712B, input system 712C, and output system 712D. FIG. 8 shows network 714 and system 716. FIG. 8 also shows that system 716 may include tenant data storage 722, tenant data 723, system data storage 724, system data 725, User Interface (UI) 830, Application Program Interface (API) 832, PL/SOQL 834, save routines 836, application setup mechanism 838, applications servers $800_1$-$800_N$, system process space 802, tenant process spaces 804, tenant management process space 810, tenant storage area 812, tenant data 814, and application metadata 816. In other embodiments, environment 710 may not have the same elements as those listed above and/or may have other elements instead of, or in addition to, those listed above.

User system 712, network 714, system 716, tenant data storage 722, and system data storage 724 were discussed above in FIG. 7. Regarding user system 712, processor system 712A may be any combination of one or more processors. Memory system 712B may be any combination of one or more memory devices, short term, and/or long term memory. Input system 712C may be any combination of input devices, such as one or more keyboards, mice, trackballs, scanners, cameras, and/or interfaces to networks. Output system 712D may be any combination of output devices, such as one or more monitors, printers, and/or interfaces to networks.

As shown by FIG. 8, system 716 may include a network interface 720 (of FIG. 7) implemented as a set of HTTP application servers 800, an application platform 718, tenant data storage 722, and system data storage 724. Also shown is system process space 802, including individual tenant process spaces 804 and a tenant management process space 810. Each application server 800 may be configured to tenant data storage 722 and the tenant data 723 therein, and system data storage 724 and the system data 725 therein to serve requests of user systems 712. The tenant data 723 might be divided into individual tenant storage areas 812, which can be either a physical arrangement and/or a logical arrangement of data.

Within each tenant storage area 812, tenant data 814 and application metadata 816 might be similarly allocated for each user. For example, a copy of a user's most recently used (MRU) items might be stored to tenant data 814. Similarly, a copy of MRU items for an entire organization that is a tenant might be stored to tenant storage area 812. A UI 830 provides a user interface and an API 832 provides an application programmer interface to system 716 resident processes to users and/or developers at user systems 712. The tenant data and the system data may be stored in various databases, such as one or more Oracle™ databases.

Application platform 718 includes an application setup mechanism 838 that supports application developers' creation and management of applications, which may be saved as metadata into tenant data storage 722 by save routines 836 for execution by subscribers as one or more tenant process spaces 804 managed by tenant management process 810 for example. Invocations to such applications may be coded using PL/SOQL 834 that provides a programming language style interface extension to API 832. A detailed description of some PL/SOQL language embodiments is discussed in commonly owned co-pending U.S. Provisional Patent Application 60/828,192 entitled, PROGRAMMING LANGUAGE METHOD AND SYSTEM FOR EXTENDING APIS TO EXECUTE IN CONJUNCTION WITH DATABASE APIS, by Craig Weissman, filed Oct. 4, 2006, which is incorporated in its entirety herein for all purposes. Invocations to applications may be detected by one or more system processes, which manages retrieving application metadata 816 for the subscriber making the invocation and executing the metadata as an application in a virtual machine.

Each application server 800 may be communicably coupled to database systems, e.g., having access to system data 725 and tenant data 723, via a different network connection. For example, one application server $800_1$ might be coupled via the network 714 (e.g., the Internet), another application server $800_{N-1}$ might be coupled via a direct network link, and another application server $800_N$ might be coupled by yet a different network connection. Transfer Control Protocol and Internet Protocol (TCP/IP) are typical protocols for communicating between application servers 800 and the database system. However, it will be apparent to one skilled in the art that other transport protocols may be used to optimize the system depending on the network interconnect used.

In certain embodiments, each application server 800 is configured to handle requests for any user associated with any organization that is a tenant. Because it is desirable to be able to add and remove application servers from the server pool at any time for any reason, there is preferably no server affinity for a user and/or organization to a specific application server 800. In one embodiment, therefore, an interface system implementing a load balancing function (e.g., an F5 Big-IP load balancer) is communicably coupled between the application servers 800 and the user systems 712 to distribute requests to the application servers 800.

In one embodiment, the load balancer uses a least connections algorithm to route user requests to the application servers 800. Other examples of load balancing algorithms, such as round robin and observed response time, also can be used. For example, in certain embodiments, three consecutive requests from the same user could hit three different application servers 800, and three requests from different users could hit the same application server 800. In this manner, system 716 is multi-tenant, wherein system 716 handles storage of, and access to, different objects, data and applications across disparate users and organizations.

As an example of storage, one tenant might be a company that employs a sales force where each salesperson uses system 716 to manage their sales process. Thus, a user might maintain contact data, leads data, customer follow-up data, performance data, goals and progress data, etc., all applicable to that user's personal sales process (e.g., in tenant data storage 722). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 716 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 716 might also maintain system level data usable by multiple tenants or other data. Such system level data might include industry reports, news, postings, and the like that are sharable among tenants.

In certain embodiments, user systems 712 (which may be client systems) communicate with application servers 800 to request and update system-level and tenant-level data from system 716 that may require sending one or more queries to tenant data storage 722 and/or system data storage 724. System 716 (e.g., an application server 800 in system 716) automatically generates one or more SQL statements (e.g., one or more SQL queries) that are designed to access the desired information. System data storage 724 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to the present invention. It should be understood that "table" and "object" may be used interchangeably herein. Each table generally contains one or more data categories logically arranged as columns or fields in a viewable schema. Each row or record of a table contains an instance of data for each category defined by the fields.

For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

While the invention has been described by way of example and in terms of the specific embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method comprising:

receiving a request for access to a resource from a remote user device, the request received by an application-level firewall;

associating a token with the request, by the application-level firewall, wherein the token is added to a session context and the token is injected into multiple events that originate from the request to service the request during the session to allow the application-level firewall to correlate the request with a corresponding session wherein associating a token with the request comprises the application-level firewall modifying logic of the request to include the token;

storing the token and associated information in an event correlator communicatively coupled with the application-level firewall;

associating the token with one or more subsequent actions by the resource in response to receiving the request, wherein the one or more subsequent actions comprises at least generating a database query based on the request, the database query including the token in logic of the database query;

selectively applying one or more traffic management policies by the application-level firewall based on at least the session context having the token by at least identifying abnormalities in transactions through the application-level firewall utilizing at least a statistical model, wherein a total score is maintained over a session and can be updated by multiple host system entities; and transmitting a response to the request with the token to the remote user device via the application firewall, wherein the application-level firewall analyzes the response and determines an action to be taken on the response based on the token and the associated information.

2. The method of claim 1 wherein the resource is part of a multitenant environment.

3. The method of claim 2 wherein the multitenant environment comprises a multitenant database environment, wherein the multitenant database environment stores data for multiple client entities each identified by a tenant identifier (ID) having one or more users associated with the tenant ID, wherein users of each of multiple client entities can only access data identified by a tenant ID associated with the respective client entity, and wherein the multitenant database is a hosted database provided by an entity separate from the client entities, and provides on-demand database service to the client entities.

4. The method of claim 1 wherein associating a token with the request comprises the application-level firewall inserting the token in at least a header of the request.

5. The method of claim 1 wherein associating a token with the request comprises the application-level firewall modifying logic of the request to include the token.

6. The method of claim 1 wherein the one or more subsequent actions comprises at least generating a file event based on the request, the file event including the token.

7. The method of claim 1 wherein the one or more subsequent actions comprises at least generating a network request based on the request, the network request including the token.

8. An article comprising a non-transitory computer-readable medium having stored thereon instructions that, when executed by one or more processors, are configurable to cause the one or more processors to:

receive a request for access to a resource from a remote user device, the request received by an application-level firewall;

associate a token with the request, by the application-level firewall, wherein the token is added to a session context and the token is injected into multiple events that originate from the request to service the request during the session to allow the application-level firewall to correlate the request with a corresponding session;

store the token and associated information in an event correlator communicatively coupled with the application-level firewall;

associate the token with one or more subsequent actions by the resource in response to receiving the request, wherein the one or more subsequent actions comprises at least generating a database query based on the request, the database query including the token in logic of the database query;

selectively apply one or more traffic management policies by the application-level firewall based on at least the session context having the token by at least identifying abnormalities in transactions through the application-level firewall utilizing at least a statistical model, wherein a total score is maintained over a session and can be updated by multiple host system entities; and transmit a response to the request with the token to the remote user device via the application firewall, wherein the application-level firewall analyzes the response and determines an action to be taken on the response based on the token and the associated information.

9. The article of claim 8 wherein the resource is part of a multitenant environment.

10. The article of claim 9 wherein the multitenant environment comprises a multitenant database environment, wherein the multitenant database environment stores data for multiple client entities each identified by a tenant identifier (ID) having one or more users associated with the tenant ID, wherein users of each of multiple client entities can only access data identified by a tenant ID associated with the respective client entity, and wherein the multitenant database is a hosted database provided by an entity separate from the client entities, and provides on-demand database service to the client entities.

11. The article of claim 8 wherein the instructions that cause the one or more processors to associate a token with the request comprise instructions that, when executed, cause the one or more processors to insert the token in at least a header of the request.

12. The article of claim 8 wherein the instructions that cause the one or more processors to associate a token with the request comprise instructions that, when executed, cause the one or more processor to modify logic of the request to include the token.

13. The article of claim 8 wherein the one or more subsequent actions comprises at least generating a file event based on the request, the file event including the token.

14. The method of claim 8 wherein the one or more subsequent actions comprises at least generating a network request based on the request, the network request including the token.

15. A system comprising:

a computing environment coupled over a network to communicate with multiple user systems each having at least one memory device and one or more hardware processing devices coupled with the at least one memory device, the computing environment comprising at least an application-level firewall and an application, both coupled to receive traffic from the multiple user systems, the application-level firewall and the application to interact to receive a request for access to a resource from a remote user device, the request received by an application-level firewall to associate a token with the request, by the application-level firewall, wherein the token is added to a session context and the token is injected into multiple events that originate from the request to service the request during the session to allow the application-level firewall to correlate the request with a corresponding session, to store the token and associated information in an event correlator communicatively coupled with the application-level firewall, to associate the token with one or more subsequent actions by the resource in response to receiving the request, wherein the one or more subsequent actions comprises at least generating a database query based on the request, the database query including the token in logic of the database query, to selectively apply one or more traffic management policies by the application-level firewall based on at least the session context having the token by at least identifying abnormalities in transactions through the application-level firewall utilizing at least a statistical model, wherein a total score is maintained over a session and can be updated by multiple host system entities, and to transmit a response to the request with the token to the remote user device via the application firewall, wherein the application-level firewall analyzes the response and determines an action to be taken on the response based on the token and the associated information.

16. The system of claim 15 wherein associating a token with the request comprises the firewall inserting the token in at least a header of the request.

17. The system of claim 15 wherein associating a token with the request comprises the firewall modifying logic of the request to include the token.

18. The system of claim 15 wherein the one or more subsequent actions comprises at least generating a file event based on the request, the file event including the token.

19. The system of claim 15 wherein the one or more subsequent actions comprises at least generating a network request based on the request, the network request including the token.

* * * * *